Jan. 30, 1940. VAN RENSSELAER P. SAXE 2,188,445
METAL CONNECTION FOR BUILDING ELEMENTS
Filed Sept. 29, 1937 2 Sheets-Sheet 1
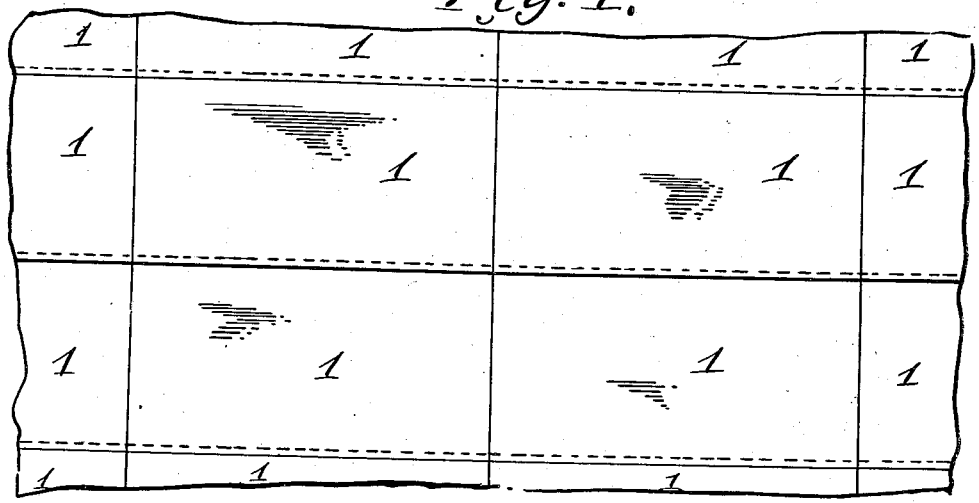
Fig. 1.
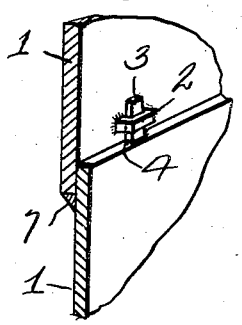 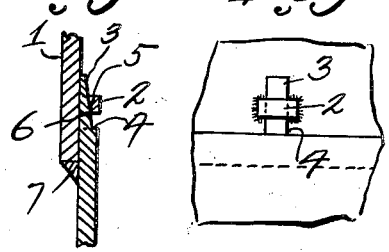 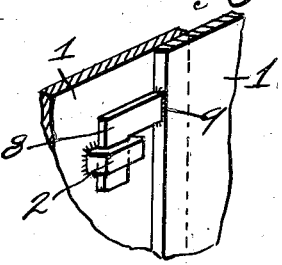
Fig. 2. Fig. 3. Fig. 4. Fig. 5.
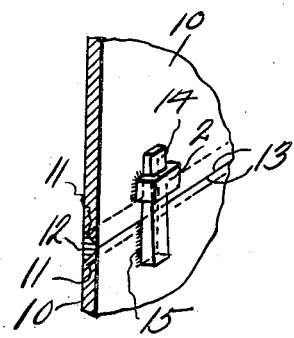 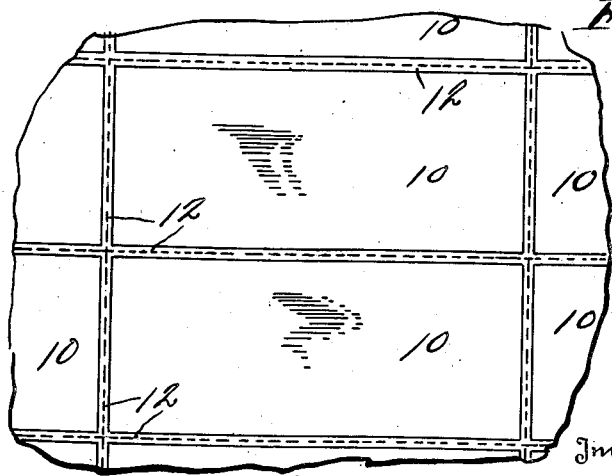
Fig. 6. Fig. 7.
Inventor
Van Rensselear P. Saxe
By Philip A. H. Purcell
Attorney Jan. 30, 1940. VAN RENSSELAER P. SAXE 2,188,445
METAL CONNECTION FOR BUILDING ELEMENTS
Filed Sept. 29, 1937 2 Sheets-Sheet 2
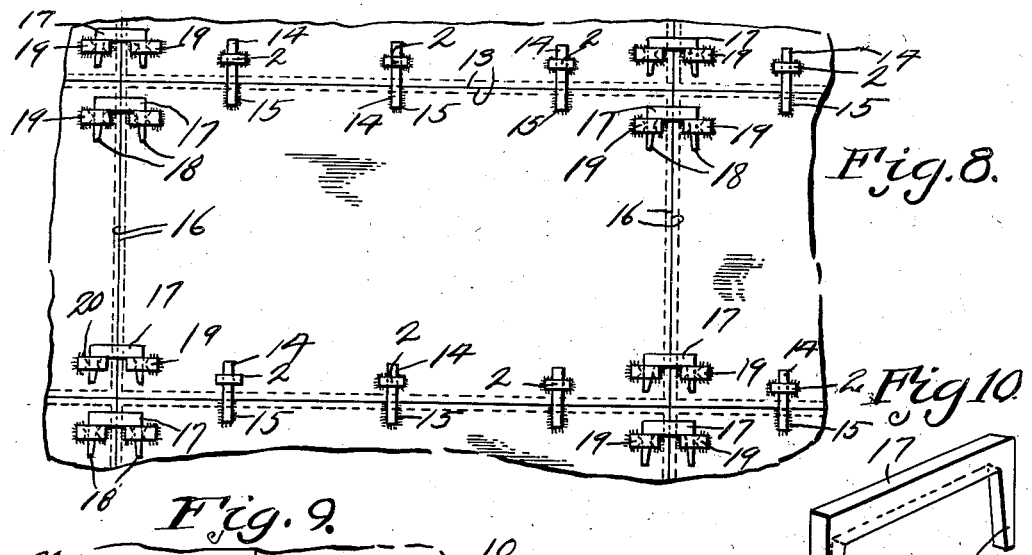
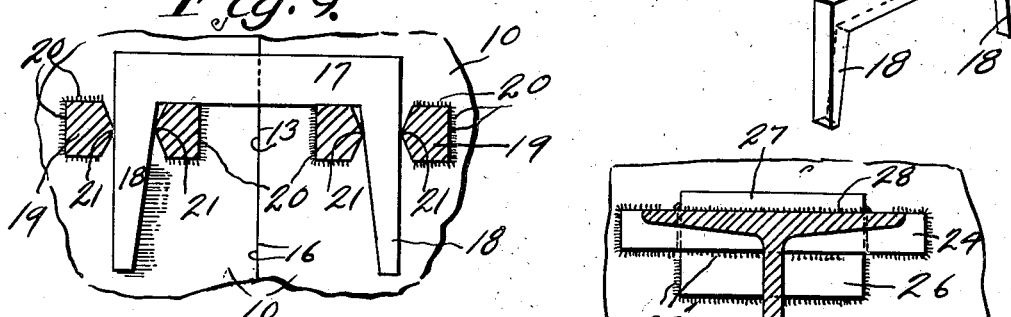
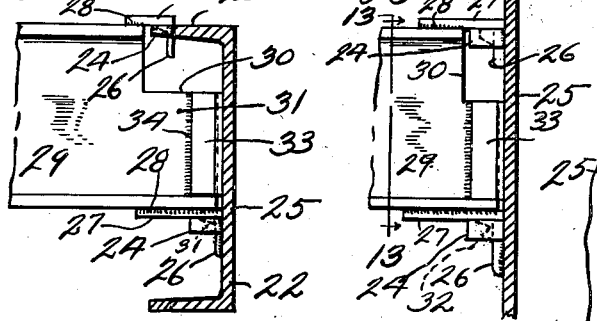
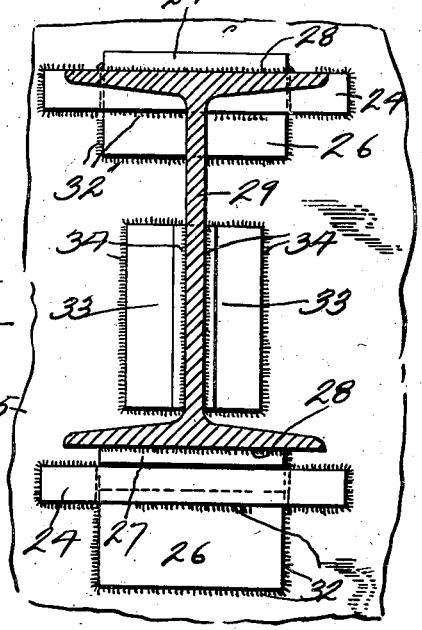
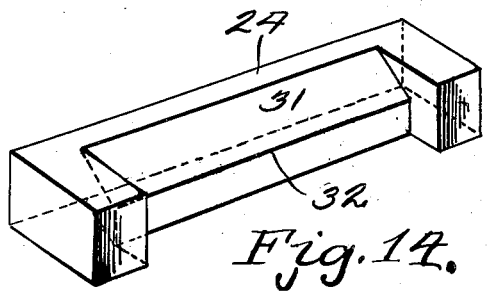
Inventor
Van Rensselaer P. Saxe
By Philip A. Terrell
Attorney Patented Jan. 30, 1940

2,188,445

UNITED STATES PATENT OFFICE 2,188,445

METAL CONNECTION FOR BUILDING ELEMENTS

Van Rensselaer P. Saxe, Baltimore, Md.

Application September 29, 1937, Serial No. 166,435

3 Claims. (Cl. 189—36)

The invention relates to metal connnections for metallic building elements, and has for its object to provide connnecting means whereby building elements, when connected, will be pulled into positive facial engagement and rigidly held for a welding operation after assembling.

A further object is to provide yokes welded to one of the elements and having bevelled interior surfaces terminating in sharpened edges and adapted to receive elements welded to other building elements for forcing the building elements to a fixed predetermined position for a welding operation, for connecting the elements together, thereby overcoming some of the difficulties experienced where the angle member has a tapered face cooperating with a straight yoke as shown in my Patent #1,824,631, issued September 22, 1931.

A further object is to provide a connnector for building elements for forcing said building elements to a predetermined fixed position for a following welding operation and comprising yokes and angle members carried by the elements, and bevelled knife edges within the yokes and engaging edges of the angle elements.

A further object is to provide means whereby a plurality of building elements may be accurately supported and rigidly held in their final structural positions so that all of said elements may be welded together.

A further object is to provide a system of rigidly holding structional plates in their relative structural positions so they may be welded together.

A further object is to provide the plates with yokes at fixed positions for receiving holding members carried by the plates for holding a plurality of plates in assembled position preparatory to a final welding operation.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a view in elevation of a plurality of metal sheets forming the side of a building structure, a tank or a ship.

Figure 2 is a detail perspective view showing the interengaging means on the horizontal edges of the plates and disposed in yokes carried by adjacent plates.

Figure 3 is a vertical transverse sectional view through the yoke and lug shown in Figure 2.

Figure 4 is a view in elevation of portions of overlapped plates showing the yoke and lug shown in Figure 2.

Figure 5 is a detail perspective view showing the angle lugs for connecting the sides of the plates.

Figure 6 is a detail perspective view showing the plates held in the same plane.

Figure 7 is a view in elevation showing a plate structure formed from a plurality of plates of the type shown in Figure 6.

Figure 8 is a rear elevation of the structure shown in Figures 6 and 7.

Figure 9 is a vertical transverse sectional view through yokes of adjacent plates, showing the side holding means for the plates.

Figure 10 is a perspective view of one of the U-shaped holding members.

Figure 11 is a vertical transverse sectional view through a conventional form of channel, showing a beam connection thereto.

Figure 12 is a vertical transverse sectional view through a plate or other building element showing a beam connection thereto.

Figure 13 is a vertical transverse sectional view on line 13—13 of Figure 12.

Figure 14 is a perspective view of one of the yokes shown in Figures 11 and 12.

Referring to the drawings, and particularly to Figures 1 to 5 inclusive, the numeral 1 designates a plurality of overlapped plates, for instance of the type used in constructing tanks or ship hulls, and which plates are held in relative position preparatory to a welding operation by means of yokes 2 welded thereto adjacent their marginal edges. The horizontal edges of the plates are provided with lugs 3, welded at 4 to their edges, and which are received within the yoke. It will be noted by referring to Figure 3 that the inner surfaces 5 are bevelled, thereby forming sharpened edges 6, which are finished to accurate dimensions for engaging the lugs 3 and holding them in close engagement with the adjacent plate and at the same time holding the plates in close engagement for marginal welding at 7. It has been found that by bevelling the yokes that a closer engagement is obtained for the welding operation than in applicant's prior patent. The vertical edges of the plates 1 are provided with angularly shaped arms 8, which are received within the yokes 2 of adjacent plates, therefore the plates are forced together and held in position where a welding operation may easily take place. The angularly shaped arms are welded to the plate edges as shown at 9 in Figure 6.

Referring to Figures 6 to 10 inclusive, in this form the plates 10 are in the same plane and are bevelled as shown at 11, Figure 6, to form a V-shaped channel for filling at 12 when the final welding operation takes place for forming a solid welded structure. In this form it will be noted the sharp plate edges 13 are held in position by means of lugs 14, which are welded at 15 to the inner sides of the plates 10, and which lugs extend across the adjacent sides of the plates and into the yokes 2, which are similar in construction to the yokes shown in Figure 3.

The vertical edges 16, as shown in Figure 8, are held in abutting engagement by means of U-shaped members 17, the arms 18 of which are preferably outwardly tapered on their inner sides, and are received within yokes 19 welded at 20 to the plates 10 and in a predetermined position so that any of their sharp edges 21 will bite into and grip the arms 18 so they will not work upwardly after being driven to position. It will be noted that the sharp edges 21 are centrally disposed between the upper and lower sides of the yokes, hence in applying the yokes there will not be a possibility of getting the same upside down, and all the workman will have to do is to properly position the inner edges in relation to the abutting edges 13 of the plates. It will be seen that a complete structure, formed from a plurality of plates in the same plane, may be erected and rigidly held for a final welding operation for welding the marginal edges of all the plates together.

Referring to Figures 11 to 13 inclusive, and particularly to Figure 11, the numeral 22 designates a conventional form of channel, to the upper flange 23 of which is welded a yoke 24, and to the web 25 of the channel is welded a similar yoke 24. These yokes receive the flanges 26 of uniform thickness of angle members 27, which are welded at 28 to the upper and lower sides of a beam 29, which beam may be of any type, for instance an I-beam. The upper corner of the beam 29 is recessed as at 30 that the projecting portion 31 of the beam may be received within the channel and the arms 26 received within the yokes 24, which are welded to the channel, and the beam can then be lowered into a predetermined position, and during this lowering operation the flanges 26 engage the bevelled surfaces 31 within the yokes and are guided towards the channel until they are jammed between the sharpened edges 32 of the yokes and the channel so there will be a tight fit.

After the assembling operation, the flanges 26 are welded at 32 to the building elements to form a rigid structure, and if desired a direct welded web connection may be made or angle bars 33 may be welded to the web of the beam and to the building element as shown at 34, Figure 13.

In practice, the yokes and angle bars of the beams are shop welded in accurate relation to the marginal edges and ends of the structures, and after the assembling operation, the final welding takes place to form a rigid structure.

From the above it will be seen that a system of plate connecting is provided whereby a rigid structure may be assembled and finally welded together. It will also be seen that all the precision measurements take place in the shop, and the welding done after the assembling operation is not of precision type. Although the device is described and shown for structures of the building, ship and tank type, it is to be understood that applicant does not limit himself in this regard.

The invention having been set forth what is claimed as new and useful is:

1. The combination with adjacent building elements at angles to each other, of a connection between said elements, said connection comprising a weld connected yoke carried by one of said elements, a flange carried by one of said elements and adapted to be received within the yoke, said flange being of substantially uniform thickness and a transverse upwardly bevelled shoulder within the yoke spaced from at least one of the upper and lower sides thereof and cooperating with the inner wall of the flange for forcing the outer wall of the flange into flat close engagement with one of the building elements.

2. A device as set forth in claim 1 wherein the upper portion of the passage through the yoke is substantially greater than the thickness of the flange and the lower portion between the shoulder and the adjacent building element is of the same dimension as the thickness of the flange.

3. The combination with adjacent building elements at an angle to each other, of a connection between said elements, said connection comprising spaced yokes having a weld connection to one of the elements, downwardly extending flanges carried by the other building element and adapted to be received within the yokes and forced towards the yoke carrying building element, the flange carried building element having one of its corners recessed for the reception of one of the yokes whereby its end may be assembled between the yokes in a position whereby upon movement of the last named element towards the yokes the flanges will be received within both yokes said downwardly extending flanges being of uniform thickness and a bevelled shoulder within each yoke terminating in a sharpened transverse flange engaging member spaced from the upper and lower sides of the yokes.

VAN RENSSELAER P. SAXE.